Patented July 27, 1943

2,325,360

UNITED STATES PATENT OFFICE 2,325,360

METHOD OF TREATING JUICES AND PRODUCT

Samuel H. Ayers and David L. Loetscher, Philadelphia, Pa., assignors to Crown Can Company, Philadelphia, Pa., a corporation of Pennsylvania No Drawing. Application February 6, 1941, Serial No. 377,740

12 Claims. (Cl. 99—155)

This invention relates to a method of treating juices for packaging so that the juices will retain as nearly as possible their original flavor, and to the resultant product. By the term "juices" as used herein, we mean the potable juices of fruits and vegetables.

In the canning of juices by conventional methods the extracted juices are first deaerated to remove the oxygen, this assisting in preventing oxidation and flavor changes, then pasteurized and packaged. The deaeration gives the product a flat taste which may be improved when the container is opened, although seldom done, by extended agitation. Any necessity for such reaeration by the consumer is obviously undesirable.

According to the present invention we follow the pasteurizing step with a step wherein the gases removed in the deaeration step are replaced with carbon dioxide so that when the container is opened the juices will have substantially the same gaseous content as in the original state.

As a step subsidiary to the replacement step we preferably, although not necessarily in all cases, add a non-toxic acid to the pasteurized juice in order to reestablish the pH, increased by the carbon dioxide, of the original juice.

As applied to orange juice, for example, the method is carried out as follows:

The juice, after extraction, is passed through a vacuum chamber where it is deaerated and is then flash-pasteurized and filled into the can at a temperature of around 180° to 190° F. As the can is passed to the filling apparatus, dry calcium carbonate, or a mixture of dry calcium carbonate and citric acid, is dropped into the can and desirably the treating agent or agents may be in the form of tablets of predetermined effect deposited by a tablet dispensing machine. The can is immediately sealed and the reaction between the calcium carbonate and the normal acid of the juices, or between the carbonate, the normal acid and the added citric acid, releases the required amount of carbon dioxide in the sealed can.

For twelve ounces of orange juice in a No. 1 can the following amounts of carbonate and citric acid give the following results.

0.45 gram calcium carbonate  
0.84 gram citric acid } gives 0.3 vol. $CO_2$ 0.6 gram calcium carbonate  
1.12 grams citric acid } gives 0.4 vol. $CO_2$ 0.75 gram calcium carbonate  
1.40 grams citric acid } gives 0.5 vol. $CO_2$ For orange juice, and in general, it is found that 0.4 volume of $CO_2$ is the most desirable amount and by 0.4 volume we mean a volume of $CO_2$ equivalent to 0.4 the volume of the juice measured under standard conditions.

As above indicated, carbon dioxide treatment of the juices can be effected under the invention without the addition of the acid. However, in the absence of the added acid the pH is increased as shown by the following figures.

|  | pH |
|---|---|
| Natural orange juice | 3.75 |
| Calcium carbonate added to give— | |
|     0.3 vol. $CO_2$ | 3.95 |
|     0.4 vol. $CO_2$ | 4.20 |
|     0.5 vol. $CO_2$ | 4.25 |

Of course, in cases where this increase in pH is not undesirable, the additional acid may be dispensed with. However, in the case of most juices it may be desirable to add a suitable agent along with the carbonate in order to establish the original pH of the juice.

Other carbonates capable of liberating carbon dioxide may be used, but calcium carbonate has been found to be particularly suited in view of its delayed action and also in view of the advantage of increasing the calcium content of the juices. Sodium carbonate may be mentioned as another usable agent, but the reaction is relatively rapid so that the can must be immediately sealed in order to prevent undue loss of gas unless an excess of the agent is added to offset such loss. Also, other organic acids, such as tartaric and malic, may be used in place of the preferred citric acid and consequently it will be understood that the invention is not limited to the use of the specific ingredients mentioned in the above typical example.

When the packaged juice cools, a partial vacuum is created in the head space and in conventional practice this vacuum would be equivalent to about eighteen to twenty inches. In the practice of the present invention a certain amount of $CO_2$ comes out of solution into the head space so that a mixture of $CO_2$ and air exists in the latter. This reduces the vacuum from the above mentioned range to a point between five and fifteen inches, depending upon the amount of carbonate added. With this condition the juice is saturated, but at atmospheric pressure there will exist the preferred ratio of about 0.3 to 0.5 volume of gas per volume of juice.

In view of the reduction in the degree of vacuum in the can another important feature arises from the practice of the invention in that the susceptibility of the can to denting is reduced. The can is, so to speak, desensitized so that a slight knock will not cause the side wall to buckle inwardly under the excessive predominance of external pressure as so often occurs with the high vacuum condition prevailing in previous practice.

The slight gaseous content of the packaged juice gives a quiescent product not differing in appearance from the original juice, i. e., there is no visible effect whatever of the carbon dioxide. It does, however, enable the packaged juice to be stored without deterioration in flavor.

The invention may be practiced without any disruption of the operating procedure at the packaging plant. The extracted juice is passed through the deaerator and the pasteurizer to the filling apparatus and as the cans are passed to the sealing apparatus a tablet of predetermined size and composition may be automatically dropped in each, the sealing operation being in no way affected.

As previously pointed out, the invention is not limited as to specific treating agents. Any suitable carbonate may be used, and any suitable pH-corrective. Any potable fruit or vegetable juice may be treated. As to these items and as to details of procedure we do not limit ourselves except as in the following claims.

We claim:

1. The method of treating an acid-containing potable fruit or vegetable juice which comprises deaerating the juice, heating the deaerated juice to a pasteurizing temperature, adding a carbonate to the hot juice in a container in such small quantity that when the container is sealed and the juice cooled the carbon dioxide content of the juice subsequently exposed under ordinary room conditions will be substantially the same as the gaseous content of the original juice, and sealing the treated hot juice in the container.

2. The method of treating an acid-containing potable fruit or vegetable juice which comprises deaerating the juice, heating the deaerated juice to a pasteurizing temperature, adding a carbonate to the hot juice in a container in such small quantity that when the container is sealed and the juice cooled the carbon dioxide content of the juice subsequently exposed under ordinary room conditions will be about 0.3 to 0.5 volume per volume of juice, and sealing the treated hot juice in the container.

3. The method of treating an acid-containing potable fruit or vegetable juice which comprises deaerating the juice, heating the deaerated juice to pasteurizing temperature, adding to the hot juice a carbonate and a non-toxic acid, and sealing the treated hot juice in a container, the carbonate being added in such small quantity that the carbon dioxide content of the cooled juice subsequently exposed under ordinary room conditions will be substantially the same as the gaseous content of the original juice and the added acid being in such quantity as to reestablish substantially the hydrogen ion concentration of the original juice.

4. The method of treating an acid-containing potable fruit or vegetable juice which comprises deaerating the juice, heating the deaerated juice to a pasteurizing temperature, adding to the hot juice a carbonate and a non-toxic acid, and sealing the treated hot juice in a container, the carbonate being added in such small quantity that the carbon dioxide content of the cooled juice subsequently exposed under ordinary room conditions will be about 0.3 to 0.5 volume per volume of juice and the added acid being in such quantity as to reestablish substantially the hydrogen ion concentration of the original juice.

5. The method of treating an acid-containing potable fruit or vegetable juice which comprises deaerating the juice, heating the juice to a pasteurizing temperature, filling a container with the hot juice, adding a carbonate to the hot juice in the container in such quantity that the liberated carbon dioxide is only slightly more than sufficient to replace the gases removed by deaeration, and sealing the container, the carbon dioxide in excess of the replacement volume partially filling the container head space upon cooling and thus reducing the vacuum effect in the container.

6. The method according to claim 5 wherein the liberation of carbon dioxide proceeds only to such point that the packaged juice is saturated at a vacuum of from about five to fifteen inches in the sealed container.

7. A deaerated pasteurized juice containing replacement carbon dioxide in substantially the volume of the removed gases.

8. A deaerated pasteurized juice having a replacement carbon dioxide content of about 0.3 to 0.5 volume per volume of juice.

9. A deaerated pasteurized acid-containing juice containing replacement carbon dioxide in substantially the volume of the removed gases and including an added non-toxic acid in such quantity as to reestablish substantially the hydrogen ion concentration of the original juice.

10. A deaerated pasteurized acid-containing juice having a replacement carbon dioxide content of about 0.3 to 0.5 volume per volume of juice and including an added non-toxic acid in such quantity as to reestablish substantially the hydrogen ion concentration of the original juice.

11. A sealed package having therein juice containing carbon dioxide in replacement of the original gases, the carbon dioxide being in slight excess so as to partially fill the head space of the package and the juice being saturated at a vacuum of from about five to fifteen inches.

12. The method of treating an acid-containing potable fruit or vegetable juice which comprises deaerating the juice, flash-pasteurizing the deaerated juice, filling the hot juice into containers, adding a carbonate to the hot juice in the containers in such small quantity that when the containers are sealed and the juice cooled the carbon dioxide content of the juice subsequently exposed under ordinary room conditions will be substantially the same as the gaseous content of the original juice, and immediately sealing the containers.

SAMUEL H. AYERS.
DAVID L. LOETSCHER.